(12) United States Patent
Lee et al.

(10) Patent No.: US 9,225,950 B2
(45) Date of Patent: Dec. 29, 2015

(54) DEVICE AND METHOD FOR USER INTERACTION

(75) Inventors: Joo Haeng Lee, Daejeon (KR); Hyun Kim, Daejeon (KR); Hyoung Sun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 178 days.

(21) Appl. No.: 13/585,173

(22) Filed: Aug. 14, 2012

(65) Prior Publication Data

US 2013/0162521 A1    Jun. 27, 2013

(30) Foreign Application Priority Data

Dec. 22, 2011    (KR) ........................ 10-2011-0140299

(51) Int. Cl.
*G09G 5/00* (2006.01)
*H04N 9/31* (2006.01)
*G06F 3/01* (2006.01)
*H04M 1/02* (2006.01)

(52) U.S. Cl.
CPC ........... *H04N 9/3173* (2013.01); *H04N 9/3185* (2013.01); *H04N 9/3194* (2013.01); *G06F 3/017* (2013.01); *H04M 1/0264* (2013.01); *H04M 1/0272* (2013.01)

(58) Field of Classification Search
None
See application file for complete search history.

(56) References Cited

U.S. PATENT DOCUMENTS

| | | | |
|---|---|---|---|
| 2008/0018591 A1* | 1/2008 | Pittel et al. ..................... | 345/156 |
| 2008/0136973 A1* | 6/2008 | Park .............................. | 348/744 |
| 2009/0033166 A1* | 2/2009 | Takeuchi et al. ......... | 310/156.01 |
| 2010/0099458 A1* | 4/2010 | Shin et al. ................. | 455/556.1 |
| 2012/0154663 A1* | 6/2012 | Park et al. ................ | 348/333.06 |
| 2012/0214546 A1* | 8/2012 | Osaka ........................ | 455/556.1 |

FOREIGN PATENT DOCUMENTS

| KR | 10-2005-0029172 A | 3/2005 |
|---|---|---|
| KR | 10-2010-0058898 A | 6/2010 |

* cited by examiner

*Primary Examiner* — Joseph Haley
*Assistant Examiner* — Ifedayo Iluyomade
(74) *Attorney, Agent, or Firm* — Rabin & Berdo, P.C.

(57) ABSTRACT

Disclosed are a device for user interaction with a combined projector and camera and a method and a device for user interaction for recognizing an actual object to augment relevant information on a surface or a periphery of the actual object. The device for user interaction, includes: at least one projector-camera pair in which a projector and a camera are paired; a motor mounted in the projector-camera pair and configured to control a location and a direction of the projector-camera pair; and a body including a computer capable of including a wireless network and configured to provide connection with an external device, and a projection space and a photographing space of the projector-camera pair overlap each other.

20 Claims, 11 Drawing Sheets

DEVICE AND METHOD FOR USER INTERACTION

CROSS-REFERENCE TO RELATED APPLICATIONS

This application claims priority to and the benefit of Korean Patent Application No. 10-2011-0140299 filed in the Korean Intellectual Property Office on Dec. 22, 2011, the entire contents of which are incorporated herein by reference.

TECHNICAL FIELD

The present invention relates to a device for user interaction with a combined projector and camera, and more particularly, to a method and a device for user interaction for recognizing an actual object to augment relevant information on a surface or a periphery of the actual object.

BACKGROUND ART

In recent years, an augmented reality application is possible through a mobile terminal such as a smart phone. In a mobile augmented reality, a user and an actual object/world is interrupted by a display. That is, the user cannot directly view the object but can view only a two-dimensional image of the display. When the user holds a terminal with his/her hand, the user has difficulty in directly touching and operating an object. Unlike the display based augmented reality technology, an augmented reality (hereinafter, referred to as 'spatial augmented reality') technology using a projector directly projects information on a surface or a periphery of an object. Accordingly, the user may directly observe the object and the world without a display, and focuses on only the object and the environment through the projected information and an interface.

In the spatial augmented reality technology, with the miniaturization in constituent elements and advent of an efficient control method, it is expected that a system is miniaturized and a real time interaction is possible.

However, in the spatial augmented reality technology, when a small projector is used, portability is easy but a projection area is small, and thus it is difficult to transfer a large quantity of information.

SUMMARY OF THE INVENTION

The present invention has been made in an effort to mount a projector-camera pair in a motor and virtually extend a projection area, thereby overcoming the limitation of a small projector.

An exemplary embodiment of the present invention provides a device for user interaction, including: at least one projector-camera pair in which a projector and a camera are paired; a motor mounted in the projector-camera pair and configured to control a location and a direction of the projector-camera pair; and a body including a computer capable of including a wireless network and configured to provide connection with an external device, in which a projection space and a photographing space of the projector-camera pair overlap each other.

Another exemplary embodiment of the present invention provides a method for user interaction, including: adding virtual information to a physical object and environment through a projector-camera pair mounted in a motor and visually presenting information and a user interface, to interact with a user; inputting an image obtained by a camera in the interaction and a current state of a motor to an interpreter; analyzing, by the interpreter, an input image, calculating a shape and a spatial coordinate of an interest object, and determining an initial value of an end effector when variation in end effector is needed, the end effector including at least a projection direction of a projector and a photographing direction of a camera; setting a control variable value through inverse kinematics, inverse projection, and an image warping methods to obtain the end effector; and setting a final control variable value through an optimizing process and transferring the set final control variable value to a mechanical part, a power control unit (PCU), and an image generator.

According to exemplary embodiments of the present invention having the above-mentioned construction and method, a projector-camera pair is mounted in a motor to virtually extend a projection area, thereby solving drawbacks in that a small projection area even through the small projector is easily portable.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

The device for user interaction according to an exemplary embodiment of the present invention includes a projector-camera pair attached to a robot.

The projector-camera pair is attached on a robot device constructed by a motor to control a location and a direction. Two or more projector-camera pairs may be attached on the robot device. A plurality of robot devices may cooperatively provide an interaction method.

One robot device has a computer capable of including a wireless network included in a body in addition to projector-camera-motor structural elements. The one robot device requests a computer outside the device to process computation which may not be processed by only a computer in the device, and receives a result from the external computer, using a wireless network. Particularly, when a plurality of devices is cooperatively used, the external computer functions as a controller.

Figure 1:
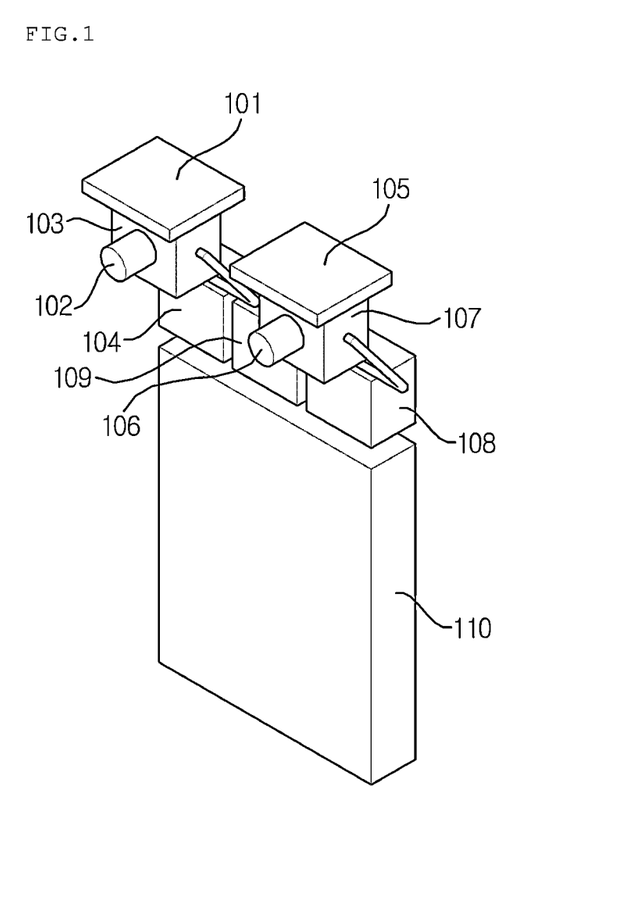
FIG. 1 is a view illustrating an example in which two projector-camera pairs are mounted according to an exemplary embodiment of the present invention.

FIG. 1 illustrates an example in which two projector-camera pairs are attached to five motors. Locations of a right projector 101, a left projector 105, a right camera 102, a left camera 106, a right tilt motor 103, a left tilt motor 107, a right fan motor 104, a left fan motor 108, a center fan motor 109, and a body 110 may be selected according to use.

Figure 2:
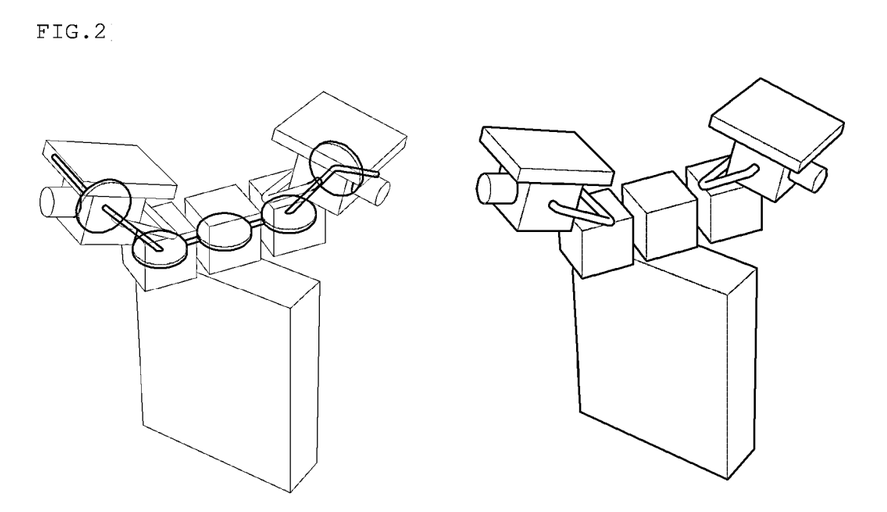
FIG. 2 is a view illustrating an example where locations of two projector-camera pairs mounted in a motor are changed according to an exemplary embodiment of the present invention.

FIG. 2 illustrates an example where locations of two projector-camera pairs mounted in a motor are changed according to an exemplary embodiment of the present invention. Reference numeral A of a right side of FIG. 2 is a center fan motor, and reference numerals B and C are left and right fan-tilt motor pairs, respectively. Because a projector-camera pair is mounted at an end of a motor, projection and photographing directions of a projector-camera are changed at an angle driving the motor.

Figure 3:
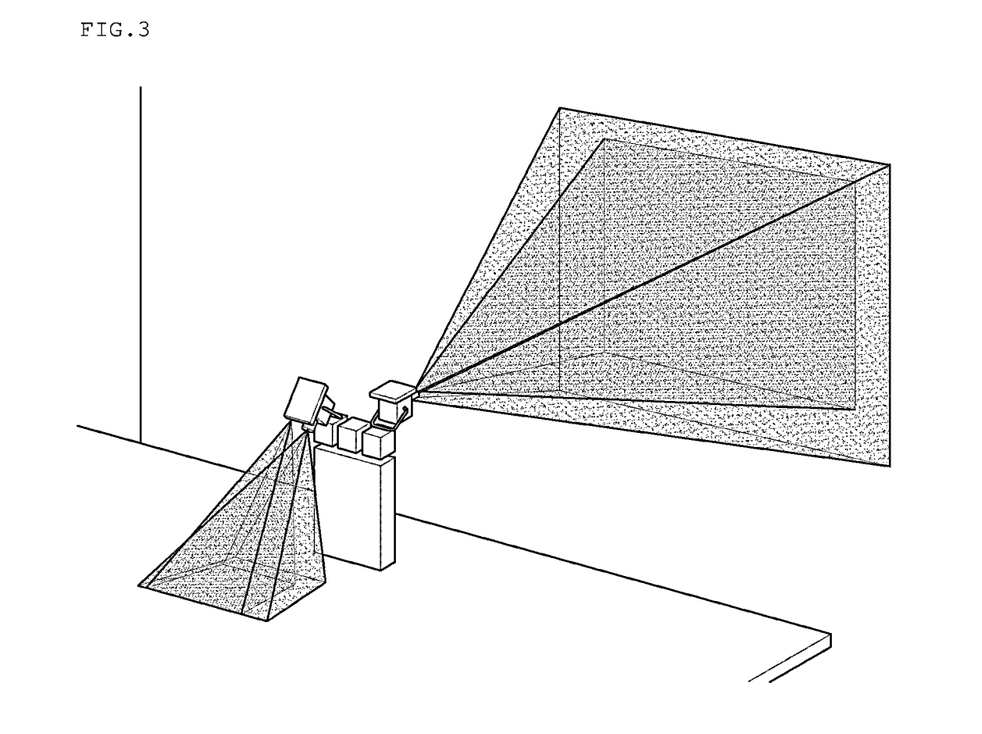
FIG. 3 is a view illustrating an example of a projection area and a photographing area of a projector and a camera in a case where two projector-camera pairs are mounted in a motor to be operated according to an exemplary embodiment of the present invention.

FIG. 3 illustrates an example of projecting an image by a projector and photographing the image by a camera in a where two projector-camera pairs are mounted in a motor to be operated according to an exemplary embodiment of the present invention. One projector-camera pair in FIG. 3 faces a wall, and the other projector-camera pair faces a desk. It is important that each projector-camera pair is configured such that a projection space and photographing space overlap each other.

Space A and space C in FIG. 3 are a projection area and are situated inside photographed areas B and D, respectively. In particular, such a configuration is important to project a user interface and control the user interface by a finger.

Figure 4A:
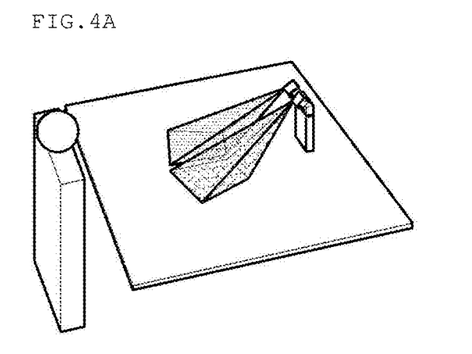
FIGS. 4A to 4C are conceptual diagrams illustrating a procedure of simultaneously projecting information and an interface using the two projector-camera pairs according to an exemplary embodiment of the present invention.
Figure 4B:
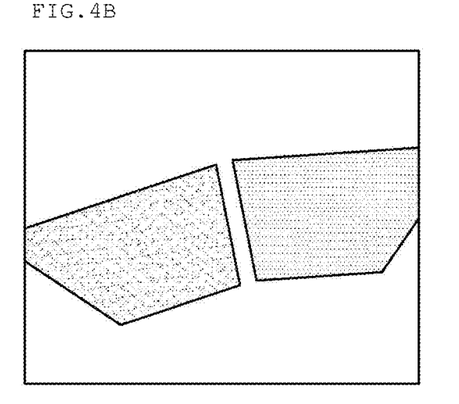
Figure 4C:
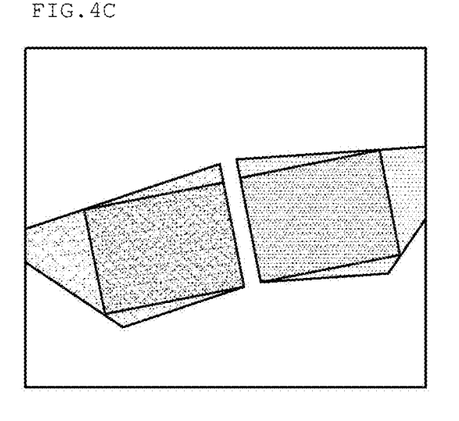

The user may see the interface and information projected by the projector. In FIG. 4A, the user views images on a desk projected by two projectors, respectively. In this case, one projector may show a user interface that may be interacted by a finger, and the other projector may show an image controlled due to the user interface (for example, a video and a video control screen). As shown in FIG. 4B, because a projection direction of the projector is not orthogonal to a projected surface, the images are perspective distorted. In this case, as shown in FIG. 4C, the projector may search and see a rectangle which greatly matches with a current projection area using an image processing method.

Figure 5A:
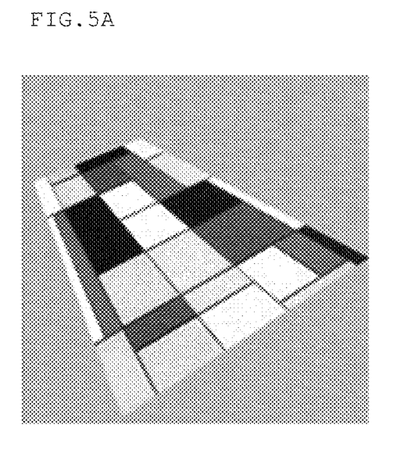
FIGS. 5A to 5C are diagrams illustrating an example of an anamorphic display method for distorting an image to be displayed before projection such that the image is accurately viewed by a user aspect according to an exemplary embodiment of the present invention.
Figure 5B:
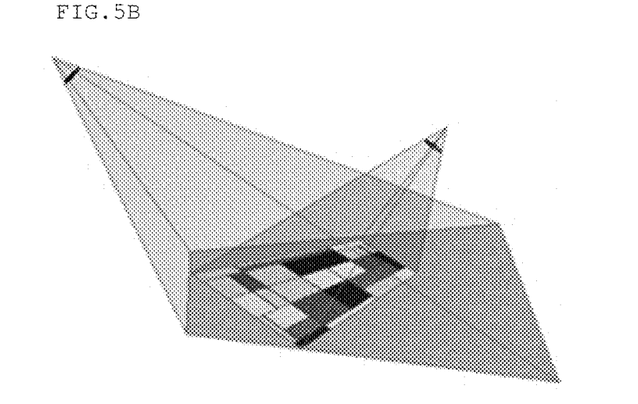
Figure 5C:
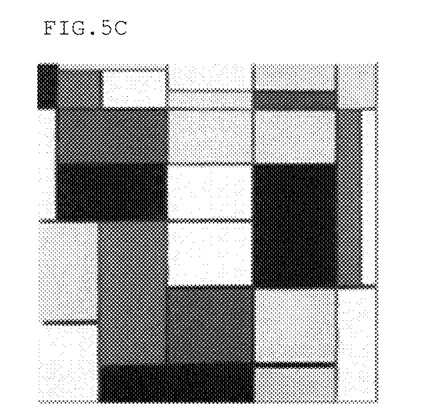

FIGS. 5A to 5C illustrate examples of an anamorphic display method for distorting an image to be displayed before projection such that the image is accurately viewed by a user aspect. FIG. 5C is an image having a square shape to be projected. It can be seen that a square shape is not maintained as shown in FIG. 5A when an image is projected to a bottom surface using a right projector in FIG. 5B. Conversely, in the present invention, as shown in FIG. 5F, if an image to be projected is pre-warped and projected as shown in FIG. 5E, the user may view an intended square image as shown in FIG. 5D. In this case, as shown in FIG. 5F, a method for pre-warping an image to be projected will be described below.

The user needs to simultaneously control a motor, images, and projection to project information and an interface to a convenient place where a user may view and a surface and a periphery of an object being an interest target. When the user controls only the motor, a projecting direction, a central point of projection, and a projecting shape become a target and the projector finds out a motor control value for achieving the target. In the present invention, four methods of controlling a mechanical unit are simultaneously used. In particular, the conventional mechanical part control and projection control are simultaneously performed with respect to a point, an area, and a shape.

Figure 6A:
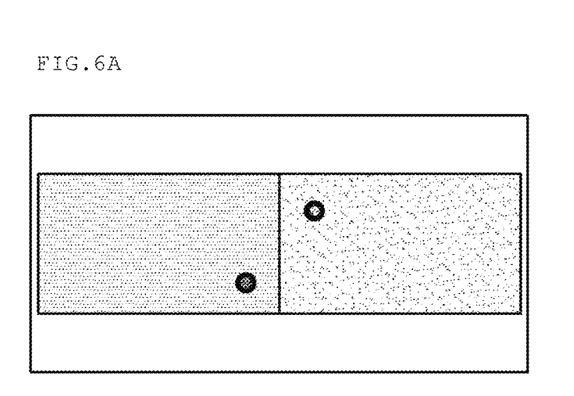
FIGS. 6A to 6F are diagrams illustrating an example of a direction control in a mechanical part control of a projector-camera pair according to an exemplary embodiment of the present invention.
Figure 6B:
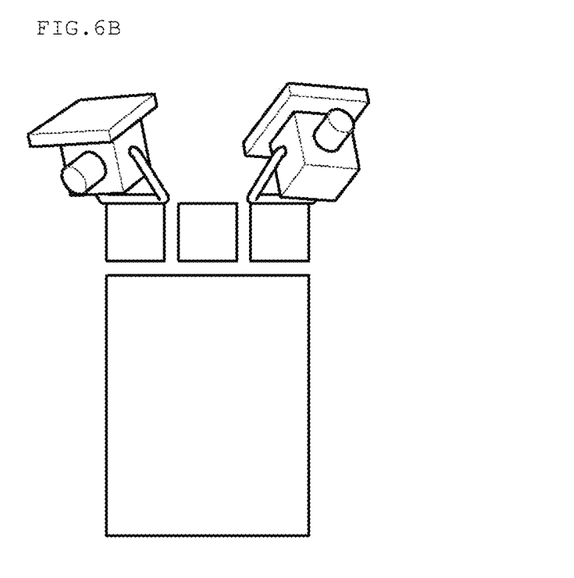
Figure 6C:
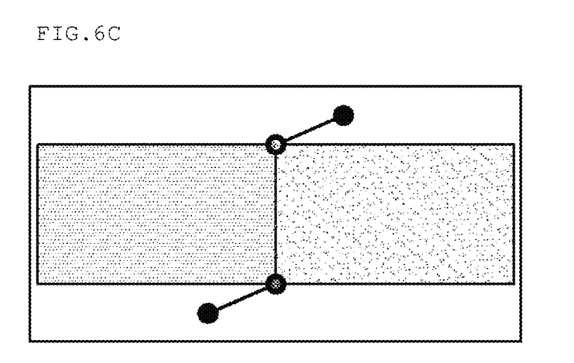
Figure 6D:
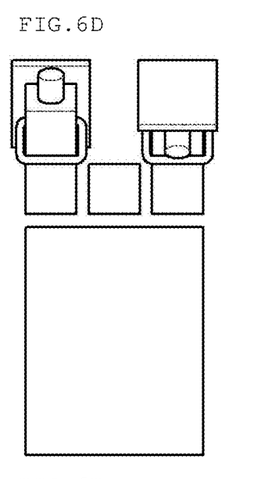
Figure 6E:
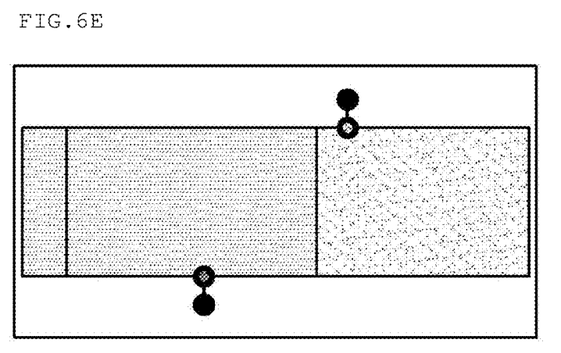
Figure 6F:
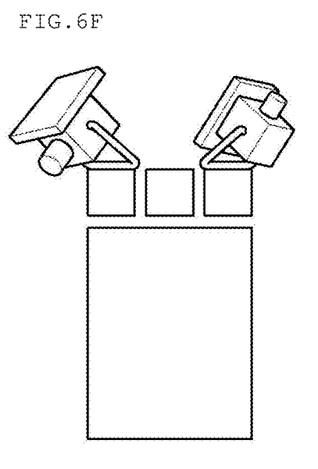

FIGS. 6A to 6F illustrate examples of a direction control in the mechanical part control. FIGS. 6A, 6C, and 6E refer to a control space. For example, rectangles A, C, F, and G indicate an operation radius of a right fan-tilt motor. Locations of rectangles A, C, F, and G and locations of rectangles B, D, and E may be moved by motion of a central fan motor, and areas H, I, and J are moving ranges restricted in the device. A total moving range of a fan ranges from −180° to 180°, and a total moving range of tilt ranges from −90° to 90°. A restricted area is affected by characteristics of a motor, a shape of a projector-camera pair, and the like. FIGS. 6A and 6B are initial postures, and points L, M, and R and points K, N, and Q are a target direction. In FIGS. 6C and 6D, a new target point is indicated by point O and point P. In this case, a central fan motor is fixed to move both side fan-tilt motors such that a target may be achieved to the highest degree. When motion of the central fan motor is allowed, a range of movement is extended, but it becomes difficult to control the movement. FIGS. 6E and 6F are such a case, which shows an example which a motor searches an optimal central fan motor moving value with respect to a target point and moves. In this case, since a given target value itself is within a limited area, the greatest tilt value is achieved.

Figure 7A:
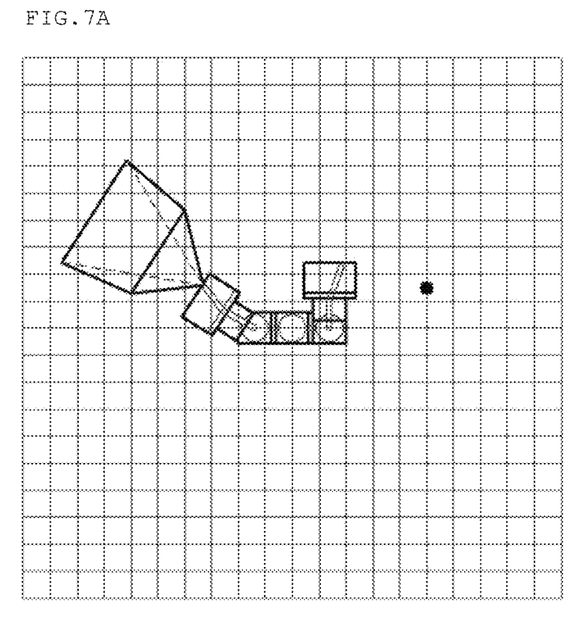
FIGS. 7A to 7F are diagrams illustrating an example of controlling a mechanical part to achieve a target when a point, an area, and a shape are given as the target in a mechanical part control of a projector-camera pair according to an exemplary embodiment of the present invention.
Figure 7B:
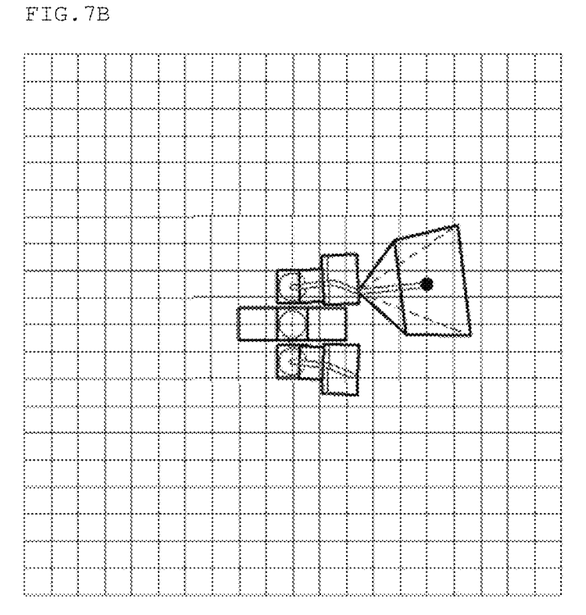
Figure 7C:
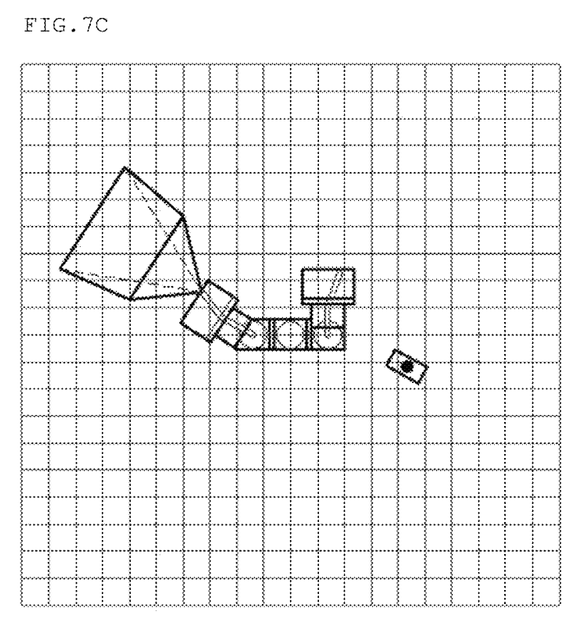
Figure 7D:
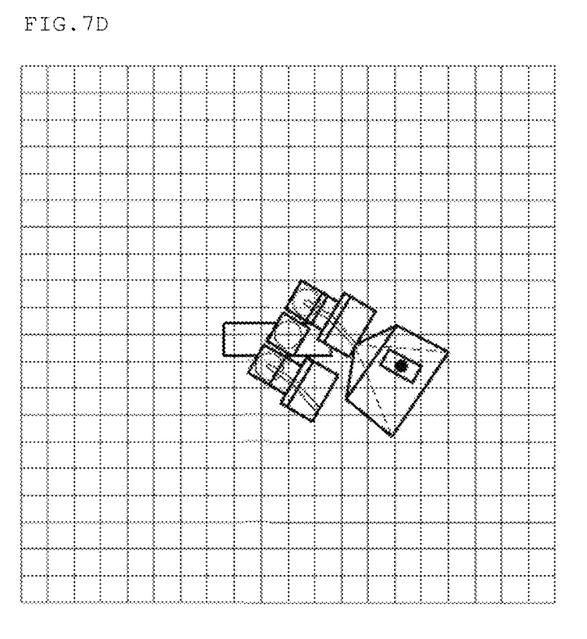
Figure 7E:
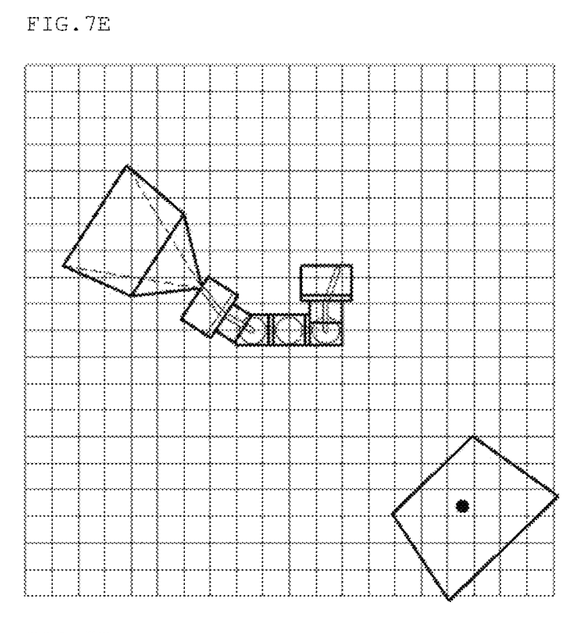

FIGS. 7A to 7F illustrate examples of controlling a mechanical part to achieve a target when a point, an area, and a shape are given as the target in control of the mechanical part. FIGS. 7A, 7C, and 7E show a given initial posture and target. The point, an area, and a shape in each column are given as the target.

In FIGS. 7A and 7B, when the point is given as the target, inverse kinematics calculation is performed such that the point may be positioned at a center of a projection area. Existing inverse kinematics consider a point of application of a physical mechanical part. However, in the present invention, a center line of projection is regarded as a virtual application line, an intersection of the line and a projected surface is regarded as the point of application, and inverse kinematics calculation is performed.

In FIGS. 7C and 7D, when the target is a certain area, a difference between a projection area and a target area is calculated to be the smallest value to find out a location of a mechanical part. There are various methods for calculating a difference between the projection area and the target area. However, it is possible to simplify calculation and obtain a desired result by maximizing a sum of distance differences between corresponding points.

Figure 7F:
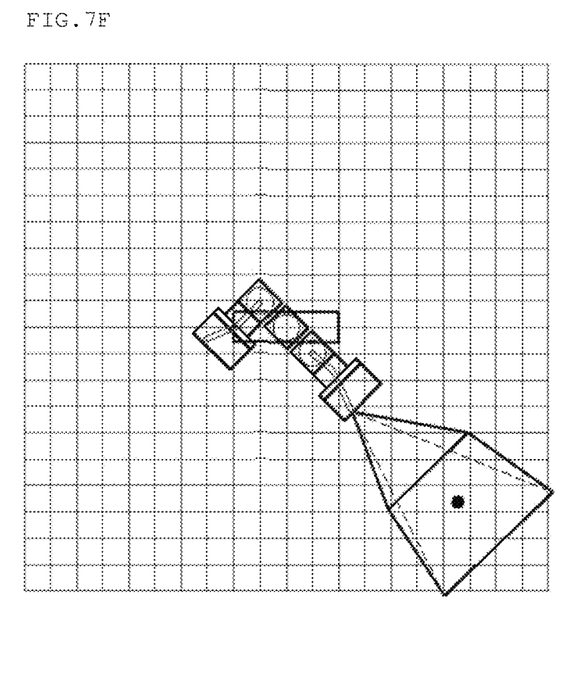

When the target is a certain shape of a certain location in FIGS. 7E and 7F, a similar approach to the second case is possible, but this increases an error. The present invention designs a discriminating equation for determining projection possibility of a shape and determines the projection possibility using the discriminating equation. When the projection is possible, a control of a corresponding mechanical part is performed. When direct projection is impossible, the proximity method as in the second case is used.

Figure 8:
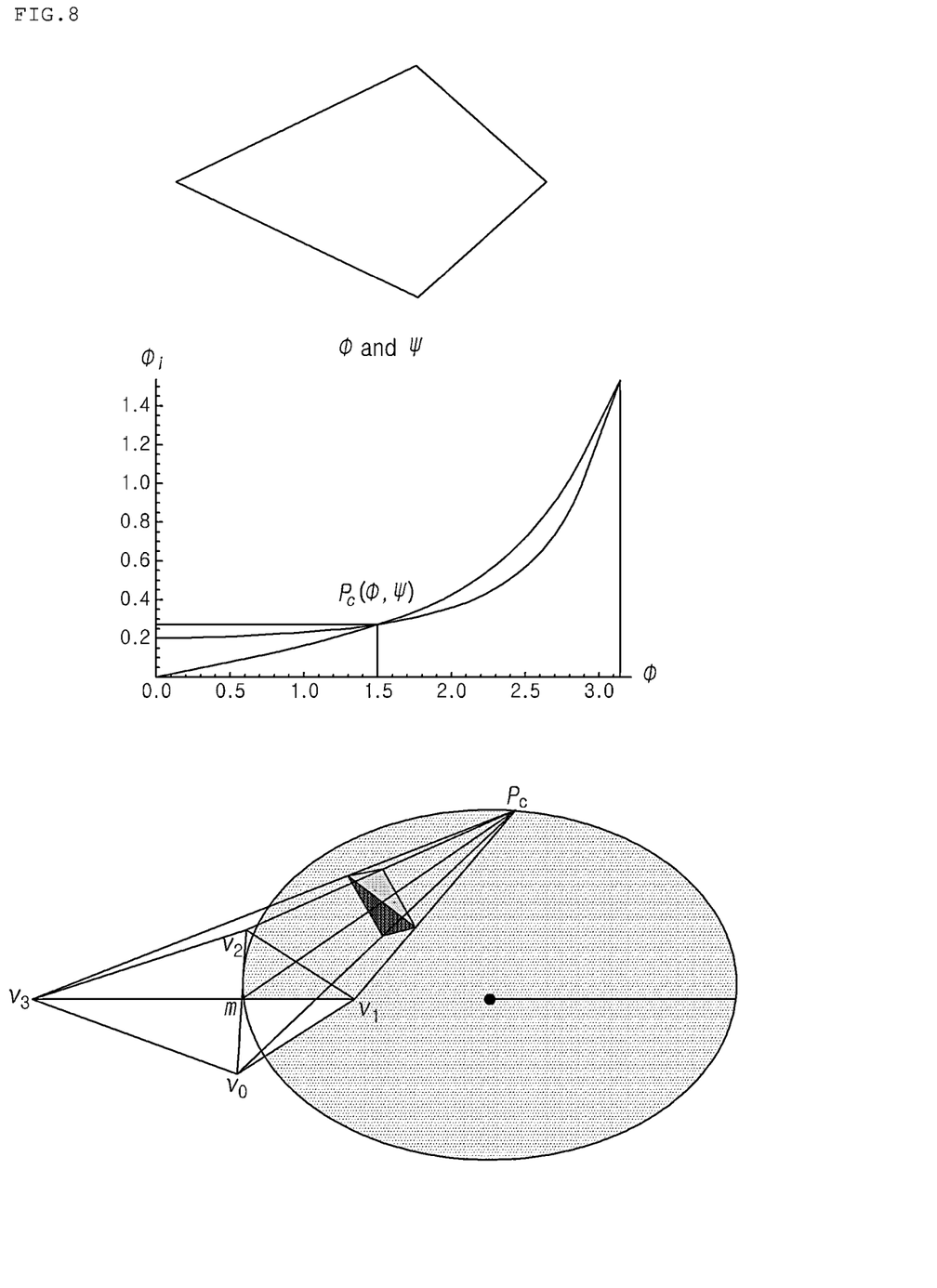
FIG. 8 is a diagram illustrating determination of projection possibility according to an exemplary embodiment of the present invention.

In FIG. 8, when a rectangle shape of an upper left end is given as a projection target, a discriminating equation of a lower left end is calculated to determine the projection possibility. In this case, a projection location and angle at the right side may be calculated by using a projection factor included in the discriminating equation.

Figure 9:
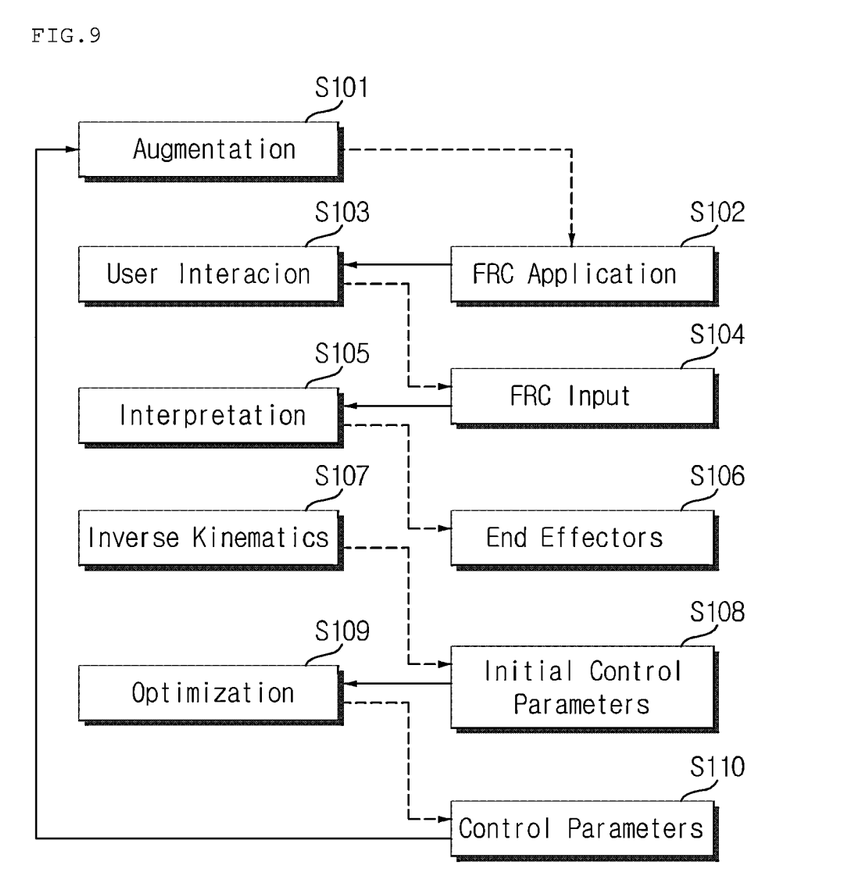
FIG. 9 is a diagram illustrating a control flow of respective structural elements in a user interaction type application using a projector-camera pair according to an exemplary embodiment of the present invention.

FIG. 9 illustrates a control flow of respective constituent elements in a user interaction type application using the device according to an exemplary embodiment of the present invention. A left side of FIG. 9 shows a flow of a main function, and a right side of FIG. 9 shows a flow of data and applications input/output by a function. The control flow of respective constituent elements will be sequentially described with reference to FIG. 9.

First, an augmentation function adds virtual information to a physical object and environment using an output unit of the device (S101). Therefore, an application interface is visually presented to a user (S102). Here, an application is configured by information/contents and a user interface. The user interacts with the application through an interface provided from the application (S103). In this case, there are a gesture, image recognition, and the like as an interaction scheme (input by a voice command, a touch sensor, and the like is not considered in a control configuration. Images obtained by a camera in the interaction, a current state of a motor, and the like are transferred to an interpreter as an input value of a system (S104).

The interpreter analyzes input image information to be adjusted to a situation of an application and calculates a shape and a spatial coordinate of an interest object. When variation in end effector is needed, the interpreter determines an initial value of the end effector (S105). Simply, an end effector of the device according to an exemplary embodiment of the present invention refers to a projection direction of a projector and a photographing direction of a camera, and is defined together with a location and an area in a three-dimensional space in an elaborate application (S106). A control variable value is set through conventional inverse kinematics, inverse projection, and image warping methods to obtain the defined end effector (S107). The inverse projection method is newly studied with the introduction of a spatial augmented reality method.

There are a displacement value of each motor, a projector/camera control value, and a control variable of a graphics pipeline for correcting a shape of an image as examples of the main control variable (S108). A series of control variable values are determined by a mathematic model. There may be a plurality of values or no value satisfying conditions. A value may be restricted by a situation of an application or a systematically restricted condition. A final control variable value is determined through an optimizing process (S109 and S110). If the final control variable value is transferred to the mechanical part, a power control unit (PCU), and an image generator, information augmentation by the projector and collection of user input values by a camera are repeatedly performed.

As mentioned above, the present invention may provide an augmented reality method of directly projecting information to an actual object using a projector without requiring a separate display device. The present invention may simultaneously project information and an interface using a plurality of projector-camera pairs mounted in a motor. An image may be projected without distortion in consideration of a user and conditions of an object using a projector-camera pair, and the image may be converted through a relative location correction of the camera and the projector. The present invention may simultaneously control the mechanical unit, the projecting unit, and the image processor. As a result, an optional projecting direction, a center point, an area, and a shape may be set as the target to control respective constituent elements, and a problem of an inverse projection may be solved using a projection discriminating equation.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A device for user interaction, comprising:
   projector-camera pairs each having a projector and a camera paired together;
   a body including a computer capable of including a wireless network and configured to provide connection with an external device; and
   a plurality of motors including
      a first motor mounted in a first of the projector-camera pairs and configured to control both a location and a direction of movement of the first projector-camera pair so that the first projector-camera pair is movable relative to the body around two different axes,
      a second motor mounted in a second of the projector-camera pairs and configured to control both a location and a direction of movement of the second projector-camera pair so that the second projector-camera pair is movable relative to the body around two different axes that are each different from each of the two different axes that the first projector-camera pair is movable around,
   wherein a projection space and a photographing space of the projector-camera pairs overlap each other.

2. The device of claim 1, wherein the first projector-camera pair shows a user interface for the user's interaction, and the second projector-camera pair shows an image controlled by the user through the user interface.

3. The device of claim 1, wherein when a projecting direction of one of the projectors is not orthogonal to a projected surface so as to project a distorted image, a rectangle which is within a current projection area is searched and projected.

4. The device of claim 1, wherein when a projecting direction of one of the projectors is not orthogonal to a projected surface so as to distort a projected image, a displayed image to be displayed is transformed before projecting such that the displayed image is accurately viewed by the user during the projection of the displayed image.

5. The device of claim 1, wherein when a point is one selected from the group consisting of a projecting target and a photographing target, a motor control value of one of the motors is set such that the point is positioned at a center of a projection area.

6. The device of claim 1, wherein when a certain area, that is not a point, is one selected from the group consisting of a projecting target and a photographing target, a motor control value of one of the motors is set such that a difference between a projection area and a target area, that includes the certain area, becomes the smallest possible value.

7. The device of claim 1, wherein when a certain area, that is not a point, is one selected from the group consisting of a projecting target and a photographing target,
- a motor control value of one of the motors is set according to a projection possibility determined by a discriminating equation so that the motor control value is set by using a projection factor included in the discriminating equation when the projection possibility is possible, and
- the motor control value is set such that a difference between a projection area and a target area becomes the smallest possible value when the projection possibility is impossible.

8. A method for user interaction, comprising:
- adding virtual information to a physical object and environment through projector-camera pairs mounted in motors configured to
  - control both a location and a direction of movement of a first of the projector-camera pairs so that the first projector-camera pair is movable around two different axes relative to a body, the body including a computer capable of including a wireless network and configured to provide connection with an external device, the body being connected to the projector-camera pairs, and
  - control both a location and a direction of movement of a second of the projector-camera pairs so that the second projector-camera pair is movable relative to the body around two different axes that are each different from each of the two different axes that the first projector-camera pair is movable around;
- through the projector-camera pairs, visually presenting information and a user interface to interact with the user in an interaction;
- inputting an image obtained by a camera in the interaction and a current state of one of the motors to an interpreter;
- analyzing, by the interpreter, an input image;
- calculating, by the interpreter, a shape and a spatial coordinate of an interest object;
- determining an initial value of an end effector when variation in the end effector is needed, the end effector including at least a projection direction of a projector and a photographing direction of a camera;
- setting a control variable value through inverse kinematics, inverse projection, and image warping methods to obtain the end effector having the initial value;
- setting a final control variable value through an optimizing process; and
- transferring the set final control variable value to a mechanical part, a power control unit (PCU), and an image generator.

9. The method of claim 8, wherein the control variable value includes a displacement value of each motor, a projector/camera control value, and a control variable of a graphics pipeline for correcting a shape of an image.

10. The method of claim 8, wherein the projector-camera pairs each includes a camera and a projector paired together, the motors are coupled with the projector-camera pairs so that each of the projector-camera pairs is movable by one of said plurality of motors, the method further comprising:
- separately rotating each of the projector-camera pairs so that each of the projector-camera pairs is movable relative to each other to face in different directions.

11. The method of claim 10, wherein the first projector-camera pair projects the interface for the user, and the second projector-camera pair projects an image controlled by the user via the interface.

12. The method of claim 8, further comprising:
- rotating the first projector-camera pair in a first direction; and
- rotating the first projector-camera pair in a second direction different to the first direction.

13. The method of claim 8, further comprising rotating the first projector-camera pair based upon the set final control variable.

14. The method of claim 8, wherein the input image is an image to be projected onto the interest object.

15. The method of claim 8, further comprising rotating all of each of the projector-camera pairs using the motors.

16. The device of claim 1, wherein the motors are coupled with the projector-camera pairs so that each of the projector-camera pairs is separately movable from the other projector-camera pairs by one of the motors so that each of the projector-camera pairs is rotated relative to the other projector-camera pairs so that each of the projector-camera pairs faces in a different direction.

17. The device of claim 1, further wherein the first motor rotates the first projector-camera pair in both a first direction and a second direction different to the first direction.

18. The device of claim 1, wherein all of the first projector-camera pair is rotated by the first motor.

19. The device of claim 1, wherein the first and second motors are configured to
- move the first and second projector-camera pairs respectively, so that projection and photographing spaces of the first projector-camera pair overlap with projection and photographing spaces of the second projector-camera pair, and
- move the first and second projector-camera pairs respectively, so that the projection and photographing spaces of the first projector-camera pair do not overlap with the projection and photographing spaces of the second projector-camera pair.

20. The method of claim 8, further comprising:
- moving the first and second projector-camera pairs respectively so that projection and photographing spaces of the first projector-camera pair overlap with projection and photographing spaces of the second projector-camera pair; and
- moving the first and second projector-camera pairs respectively so that the projection and photographing spaces of the first projector-camera pair do not overlap with the projection and photographing spaces of the second projector-camera pair.

* * * * *